(12) United States Patent
Van Der Poel (10) Patent No.: US 9,232,770 B2
(45) Date of Patent: Jan. 12, 2016

(54) ANIMAL BRUSHING ARRANGEMENT

(75) Inventor: Hans Van Der Poel, Roelofarendsveen (NL)

(73) Assignee: DELAVAL HOLDING AB, Tumba (SE)

( * ) Notice: Subject to any disclaimer, the term of this patent is extended or adjusted under 35 U.S.C. 154(b) by 362 days.

(21) Appl. No.: 13/809,173

(22) PCT Filed: Jun. 16, 2011

(86) PCT No.: PCT/SE2011/050754
§ 371 (c)(1),
(2), (4) Date: Feb. 5, 2013

(87) PCT Pub. No.: WO2012/005654
PCT Pub. Date: Jan. 12, 2012

(65) Prior Publication Data
US 2013/0125828 A1  May 23, 2013

Related U.S. Application Data

(60) Provisional application No. 61/363,044, filed on Jul. 9, 2010.

(30) Foreign Application Priority Data

Jul. 9, 2010 (SE) ....................... 1050778

(51) Int. Cl.
*A01K 13/00* (2006.01)
(52) U.S. Cl.
CPC ............... *A01K 13/00* (2013.01); *A01K 13/004* (2013.01)
(58) Field of Classification Search
CPC ..... A01K 13/00; A01K 13/04; A01K 13/004; A01K 13/001; A01K 13/002; A01K 13/003; A01K 15/024; A01K 14/00; A46B 13/00; A46B 13/02; A46B 13/001; A46B 15/00; A46B 15/0097; A46B 17/00; A46B 17/02
USPC ............ 119/609, 608; 15/53.2, 104.92, 88.2, 15/21.1, 88.3; 601/114; 4/606; 439/164
See application file for complete search history.

(56) References Cited

U.S. PATENT DOCUMENTS

| 4,932,806 | A  |   | 6/1990 | Eklund et al. |       |
|-----------|----|---|--------|---------------|-------|
| 6,209,152 | B1 | * | 4/2001 | Kannenberg ................ | 4/606 |

(Continued)

FOREIGN PATENT DOCUMENTS

| CN | 1409453 A | 4/2003 |
|----|-----------|--------|
| CN | 1575220   | 2/2005 |

(Continued)

OTHER PUBLICATIONS

International-Type Search Report, dated Jan. 4, 2011, from corresponding PCT application.

(Continued)

*Primary Examiner* — Joshua Huson
(74) *Attorney, Agent, or Firm* — Young & Thompson (57) ABSTRACT

An animal brushing arrangement includes a movable brush driven by an electric motor, a fixing part for attaching the arrangement to a stationary structure, and a first movable part which at a first end is pivotably attached to the fixing part by a first pivot arrangement to pivot about a first axis which is substantially horizontal when the fixing part is attached to the stationary structure and which allows the movable brush, suspended at a second end of the first movable part, to swing back and forth in at least one plane. An electric cable is provided to feed electric power to the electric motor. The first pivot arrangement is provided with a through hole and at least part of the through hole is arranged substantially concentrically with the first axis. The electric cable extends through the through hole.

16 Claims, 6 Drawing Sheets

(56) References Cited

U.S. PATENT DOCUMENTS

| | | |
|---|---|---|
| 6,468,096 B1 | 10/2002 | Nagatsuka |
| 6,705,574 B2 | 3/2004 | Nakagawa et al. |
| 7,836,789 B2 | 11/2010 | Haniya et al. |
| 8,020,467 B2 | 9/2011 | Haniya et al. |
| 2007/0000450 A1* | 1/2007 | Otten .......................... 119/609 |
| 2009/0095110 A1 | 4/2009 | Day et al. |
| 2009/0114165 A1* | 5/2009 | van der Poel ................ 119/609 |
| 2009/0242535 A1 | 10/2009 | Minato et al. |

FOREIGN PATENT DOCUMENTS

| | | |
|---|---|---|
| CN | 2893286 Y | 4/2007 |
| CN | 101412221 | 4/2009 |
| CN | 101450485 | 6/2009 |
| DE | 10 2004 030 234 B3 | 10/2005 |
| EP | 1 665 927 A2 | 6/2006 |
| JP | 2002239968 | 8/2002 |
| JP | 2006021299 | 1/2006 |
| RU | 1776374 A1 | 11/1992 |
| RU | 27776 U1 | 2/2003 |
| SE | 0802097 A1 | 4/2010 |
| SE | 533 063 C2 | 6/2010 |
| SU | 374883 A | 10/1984 |
| SU | 1341082 A1 | 9/1987 |
| WO | 2010/040631 A1 | 4/2010 |

OTHER PUBLICATIONS

International Search Report, dated Jan. 24, 2012, from corresponding PCT application.

Supplementary International Search Report, dated Nov. 9, 2012, from corresponding PCT application.

Translation of Chinese Office Action, dated Nov. 28, 2013, from corresponding CN application.

Chinese Office Action, dated Feb. 6, 2015, in corresponding Chinese Patent Application No. 201180034086.4.

* cited by examiner

ANIMAL BRUSHING ARRANGEMENT

TECHNICAL FIELD

The present invention relates to an animal brushing arrangement according to the precharacterizing portion of claim 1.

BACKGROUND

Some animal brushing arrangements for brushing larger animals such as livestock, horses, pigs, etc., are mounted to a stationary structure and provided with a rotating brush which is driven by an electric motor, either directly or via a gear box. The brush is provided with bristles which, when the brush is rotated, interact with the fur and skin of an animal. The animal is thus brushed, scratched and/or groomed by the rotating brush.

Objects may entangle with such a rotating brush.

In a particular kind of such animal brushing arrangements the rotating brush is suspended at one end from a brush carrying arrangement. The brush carrying arrangement comprises one or more parts, which allow the brush to swing back and forth in at least one plane. The brush may thus be moved by an animal when leaning against the brush to reach different parts of the body of the animal.

Such animal brushing arrangements may be provided with the electric motor in close vicinity to the rotating brush as disclosed in e.g. EP1665927 and SE0802097. The electric motor has to be provided with electric power and an electric cable has to be provided for this purpose. Since the electric cable has to be drawn from the stationary structure to the electric motor arranged on the brush carrying arrangement, the cable is subjected to reciprocating, twisting and possibly pinching movements which may harm the electric cable and cause the electric motor to stop.

SUMMARY

An object of the present invention is to provide an animal brushing arrangement with a reliable electric power feed to an electric motor of the brush.

According to an aspect of the invention, the object is achieved by an animal brushing arrangement for mounting to a stationary structure. The animal brushing arrangement comprises a movable brush driven by an electric motor provided adjacent to the movable brush, a fixing part adapted for attaching the animal brushing arrangement to the stationary structure, and a first movable part. The first movable part is at a first end pivotably attached to the fixing part by means of a first pivot arrangement to pivot about a first axis which is substantially horizontal when the fixing part is attached to the stationary structure and which allows the movable brush, suspended at a second end of the first movable part, to swing back and forth in at least one plane. An electric cable is provided to feed electric power to the electric motor and extends from the stationary structure to the electric motor. The first pivot arrangement is provided with a through hole and at least part of the through hole is arranged substantially concentrically with the first axis. The electric cable extends through the through hole.

Since the electric cable extends through the through hole which is concentric with the first axis, the electric cable is twisted or turned substantially only to the same extent as the first movable part pivots. Furthermore, the electric cable is protected from outside influence as it extends through the through hole. As a result, the above mentioned object is achieved.

The fixing part of the brushing arrangement may be attached, e.g. by means of bolts or straps, to the stationary structure. The stationary structure may for instance be a wall or a post in an animal stall or shed, or it may be a post or a tree in a pasture. The electric cable may be any common rubber or plastic material cable provided with two or more conductors. The electric cable extending from the stationary structure encompasses that the electric cable extends from an area next to the animal brushing arrangement, such as a roof, a floor, or the ground. The electric cable leads from an electric power connection point, such as a wall socket, to the electric motor. The electric motor is provided in the vicinity of the movable brush with only a connecting part arranged between the electric motor and the movable brush. For instance, a gearbox may be provided between a rotating output shaft of the electric motor and the movable brush. The movable brush is movable in the sense that that it may rotate or reciprocate. In a rest position, when not brushing any animal, the movable brush may be suspended such that a longitudinal axis of the movable brush extends substantially vertically.

According to embodiments, the animal brushing arrangement may comprise a second movable part to which the movable brush and the electric motor may be attached. The second movable part may be pivotably attached to the first movable part at the second end and pivotal about a substantially horizontal second axis. In this manner the movable brush may pivot about the first axis and the second axis. If these axes are substantially perpendicular, the movable brush may pivot or perform pendulum movements within a sphere and accordingly reach many parts of an animal body. In such an animal brushing arrangement the orderly arrangement of an electric cable through the first pivot arrangement may be particularly useful.

According to embodiments, the movable brush, seen in a horizontal direction when the fixing part is attached to the stationary structure, may be arranged at a distance from the first pivot arrangement. In this manner the first movable part may be an arm which allows the movable brush to be suspended at a distance from the stationary structure. The first pivot arrangement may be provided close to the fixing part and the stationary structure.

According to embodiments, the first movable part may comprise two sections, a first section which extends in a substantially horizontal direction from the fixing part, when the animal brushing arrangement is attached to the stationary structure, and a second section extending at substantially a 90 degree angle to the first section.

According to embodiments, a cable casing may extend from the fixing part through the through hole and to the electric motor forming a cable duct through which the electric cable extends. In this manner the electric cable may be protected by the cable casing. The casing may protect the cable from physical abuse such as pinching or animals chewing on the cable but also the casing may be at least partially fixedly arranged in relation to the brushing arrangement and thus the electric cable may be laid out along a safe path. The cable casing may be made from a metal or plastic material. The cable casing may be of a hollow wound spring type, inside which the electric cable may extend.

According to embodiments, the cable casing may be fixed in relation to the fixing part and in relation to the first movable part such that the cable casing is taut in a portion thereof extending through the through hole. In this manner it may be ensured that the electric cable, which extends through the casing, is only twisted to the same degree as the first movable part is pivoted and not entangle with any part of the animal brushing arrangement.

According to embodiments, the first movable part may be hollow and the electric cable may extend from the through hole through an inside of the first movable part towards the movable brush. In this manner the cable may be safely arranged inside the brushing arrangement.

According to embodiments, the cable casing may be fixed to a supporting arrangement inside the first movable part substantially at a level of the first axis. In this manner the electric cable will only be subjected to twisting along a portion thereof and will not be subjected to any bending, when the first movable part pivots.

According to embodiments, the brushing arrangement may comprise a blocking arrangement for preventing the first movable part from rotating a complete revolution with respect to the fixing part. In this manner it is ensured that the first movable part always returns from a pivoted position to a non-pivoted position in a direction of rotation opposite to a first direction of rotation by means of which the pivoted position was reached. Accordingly, consecutive twisting of the electric cable in one direction may be prevented and it is ensured that the electric cable always returns to an untwisted state.

According to embodiments, the blocking arrangement may comprise a first stopping device arranged fixedly in relation to the fixing part and attached to one part of the first pivot arrangement, and two second stopping devices attached to a wall of the first movable part next to the pivot arrangement such that when the first movable part pivots about the first pivot arrangement, the second stopping devices come to abut against the first stopping device.

According to embodiments, the movable brush may be a rotating brush. Alternatively, the movable brush may be a reciprocating brush.

According to embodiments, the movable brush may be releasably attached to a drive shaft, connected to the electric motor. In this manner the movable brush of the brushing arrangement may easily be changed without the entire brushing arrangement having to be removed from the stationary structure. Accordingly, the electric cable does not have to be subjected to stress when a movable brush is changed. The releasable attaching to the drive shaft may be achieved by means of a pin extending through an opening in a shaft of the brush and interacting with a recess, or a hole, in the drive shaft. The drive shaft may be a drive shaft of the electric motor or it may be connected to the electric motor via a gearbox or similar transmission arrangement.

According to embodiments, the movable brush may have a diameter of 30-70 cm and a length of 40-100 cm. The brush may have other diameters and/or lengths.

A brushing arrangement comprising a blocking arrangement for preventing a first part from rotating a complete revolution with respect to a fixing part may form a separate aspect of the invention. In this context there is provided an animal brushing arrangement for mounting to a stationary structure. The animal brushing arrangement comprises a movable brush driven by an electric motor provided adjacent to the movable brush, a fixing part adapted for attaching the animal brushing arrangement to the stationary structure, and a first movable part. The first movable part is at a first end pivotably attached to the fixing part by means of a first pivot arrangement to pivot about a first axis which is substantially horizontal when the fixing part is attached to the stationary structure and which allows the movable brush, suspended at a second end of the first movable part, to swing back and forth in at least one plane. The movable brush, seen in a horizontal direction when the fixing part is attached to the stationary structure, is arranged at a distance from the first pivot arrangement. The brushing arrangement comprises a blocking arrangement for preventing the first movable part from rotating a complete revolution with respect to the fixing part.

In this manner it is ensured that the first movable part always returns from a pivoted position to a non-pivoted position in a direction of rotation opposite to a first direction of rotation by means of which the pivoted position was reached. It is also ensured that the movable brush cannot pivot above a certain level defined by the construction of the blocking arrangement.

The fixing part of the brushing arrangement may be attached e.g. by means of bolts or straps to the stationary structure. The stationary structure may for instance be a wall or a post in an animal stall or shed, or it may be a post or tree in a pasture. The first movable part may be an arm which allows the movable brush to be suspended at a distance from the stationary structure. The first pivot arrangement may be provided close to the fixing part and the stationary structure. The electric motor may be connected to an electric power connection point by means of an electric cable. The electric motor is provided in the vicinity of the movable brush with only a connecting part arranged between the electric motor and the movable brush. For instance, a gearbox may be provided between a rotating output shaft of the electric motor and the movable brush. The movable brush is movable in the sense that that it may rotate or reciprocate. In a rest position, when not brushing any animal, the movable brush may be suspended such that a longitudinal axis of the movable brush extends substantially vertically.

According to embodiments, the blocking arrangement may comprise a first stopping device arranged fixedly in relation to the fixing part and attached to one part of the first pivot arrangement, and two second stopping devices attached to a wall of the first movable part next to the pivot arrangement such that when the first movable part pivots about the first pivot arrangement, the second stopping devices come to abut against the first stopping device.

According to embodiments, the first and second stopping devices may be arranged such that each of the second stopping devices will abut against the first stopping device when the first movable part has pivoted between 160-175 degrees from a vertical resting position, i.e. the first and one of the second stopping devices abut against each other when the brush is pointing in an upwardly direction.

According to embodiments, the animal brushing arrangement may comprise a second movable part to which the movable brush and the electric motor may be attached. The second movable part may be pivotably attached to the first movable part at the second end and pivotal about a substantially horizontal second axis. In this manner the movable brush may pivot about the first axis and the second axis. If these axes are substantially perpendicular, the movable brush may pivot or perform pendulum movements with in a sphere and accordingly reach many parts of an animal body.

According to a further aspect of the invention, there is provided an animal brushing arrangement for mounting to a stationary structure. The animal brushing arrangement comprises a movable brush being a rotating brush, an electric motor for driving the movable brush, a fixing part adapted for attaching the animal brushing arrangement to the stationary structure, and a carrying structure. The movable brush and the electric motor are attached to the carrying structure. The carrying structure is connected to the fixing part. The movable brush is adapted to stop rotating when a force of 50-150

Newton is applied to an outer periphery of the movable brush while electric power is supplied to the electric motor.

In such an animal brushing arrangement it is ensured that a torque up to only a maximum torque level is transferred from the electric motor to the movable brush. In case any object entangles with the movable brush, it is thus ensured that the movable brush can only pull on the object with a limited force. Accidents may thus be avoided. In case, e.g. an animal tail entangles with the movable brush, the animal can walk away from the movable brush and free itself from the movable brush.

According to embodiments, stopping the rotation of the movable brush while electric power is supplied to the electric motor may be achieved by means of a transmission arrangement comprising a slipping clutch being arranged between the electric motor and the movable brush. Alternatively, stopping the rotation of the movable brush while electric power is supplied to the electric motor may be achieved by means of the electric motor being of a type providing only a torque corresponding to 50-150 Newton at the outer periphery of the brush and enduring being stopped while being supplied with electric power.

The slipping clutch is a clutch which can only transfer a torque up to a maximum torque value. Above the maximum torque value, the clutch slips as a relative movement between two parts of the clutch occurs. A slipping clutch is sometimes also referred to as a, slipper clutch, a sliding clutch or a slip friction clutch. The electric motor may be a single phase AC asynchronous motor such as the motor of type MM71p4 of the manufacturer Carpanelli. The fixing part of the brushing arrangement may be attached e.g. by means of bolts or straps to the stationary structure. The stationary structure may for instance be a wall or a post in an animal stall or shed, or it may be a post or tree in a pasture. The carrying structure supports the movable brush and the electric motor and may suitably be provided with fastening devices, such as holes and bolts, for attaching the movable brush and the electric motor to the carrying structure. The electric motor may be connected to an electric power connection point by means of an electric cable. The electric motor may be provided in the vicinity of the movable brush. The movable brush is movable in the sense that that it is rotated by means of the electric motor.

According to embodiments, the carrying structure may comprise a first movable part which at a first end is pivotably attached to the fixing part by means of a first pivot arrangement to pivot about a first axis which is substantially horizontal when the fixing part is attached to the stationary structure and which allows the movable brush, suspended at a second end of the first movable part, to swing back and forth in at least one plane. Since such an animal brushing arrangement may reach many positions, the risk of entangling objects in the movable brush is higher than with a stationary rotating brush. Thus, the slipping clutch, or backwards rotatable electric motor, may be useful in these embodiments. The first movable part may be an arm which allows the movable brush to be suspended at a distance from the stationary structure. The first pivot arrangement may be provided close to the fixing part and the stationary structure. In a rest position, when not brushing any animal, the movable brush may be suspended such that a longitudinal axis of the movable brush extends substantially vertically.

According to embodiments, the carrying structure may comprise a second movable part to which the movable brush and the electric motor are attached, the second movable part being pivotably attached to the first movable part at the second end, and pivotal about a substantially horizontal second axis. In this manner the movable brush may pivot about the first axis and the second axis. If these axes are substantially perpendicular, the movable brush may pivot or perform pendulum movements within a sphere and accordingly reach many parts of an animal body. Since such an animal brushing arrangement with a first and a second movable part may reach many positions, there is a risk of entangling objects. Thus, the slipping clutch, or backwards rotatable electric motor, may be useful in these embodiments.

According to embodiments, the transmission arrangement may comprise a gearbox. In this manner the rotation of the movable brush may be provided at a suitable rate of revolutions. The slipping clutch may be provided between the electric motor and the gearbox, or between the gearbox and the movable brush.

According to embodiments, the movable brush, seen in a horizontal direction when the fixing part is attached to the stationary structure, may be arranged at a distance from the first pivot arrangement. The first pivot arrangement may be provided close to the fixing part and the stationary structure.

According to embodiments, the first movable part may comprise two sections, a first section which extends in a substantially horizontal direction from the fixing part, when the animal brushing arrangement is attached to the stationary structure, and a second section extending at substantially a 90 degree angle to the first section.

According to embodiments, the movable brush may be releasably attached to a drive shaft of the transmission arrangement. An easy exchanging of the movable brush may thus be achieved without any need to remove the rest of the animal brushing arrangement from the stationary structure. The movable brush may be releasably attached to the drive shaft by means of a pin extending through an opening in a shaft of the movable brush and interacting with a recess, or a hole, in the drive shaft.

Further features of, and advantages with, the present invention will become apparent when studying the appended claims and the following detailed description. Those skilled in the art will realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully with reference to the accompanying drawings, in which embodiments are shown. However, this invention should not be construed as limited to the embodiments set forth herein. Disclosed features of embodiments may be combined as readily understood by one of ordinary skill in the art to which this invention belongs. Like numbers refer to like elements throughout.

Well-known functions or constructions will not necessarily be described in detail for brevity and/or clarity.

Figure 1:
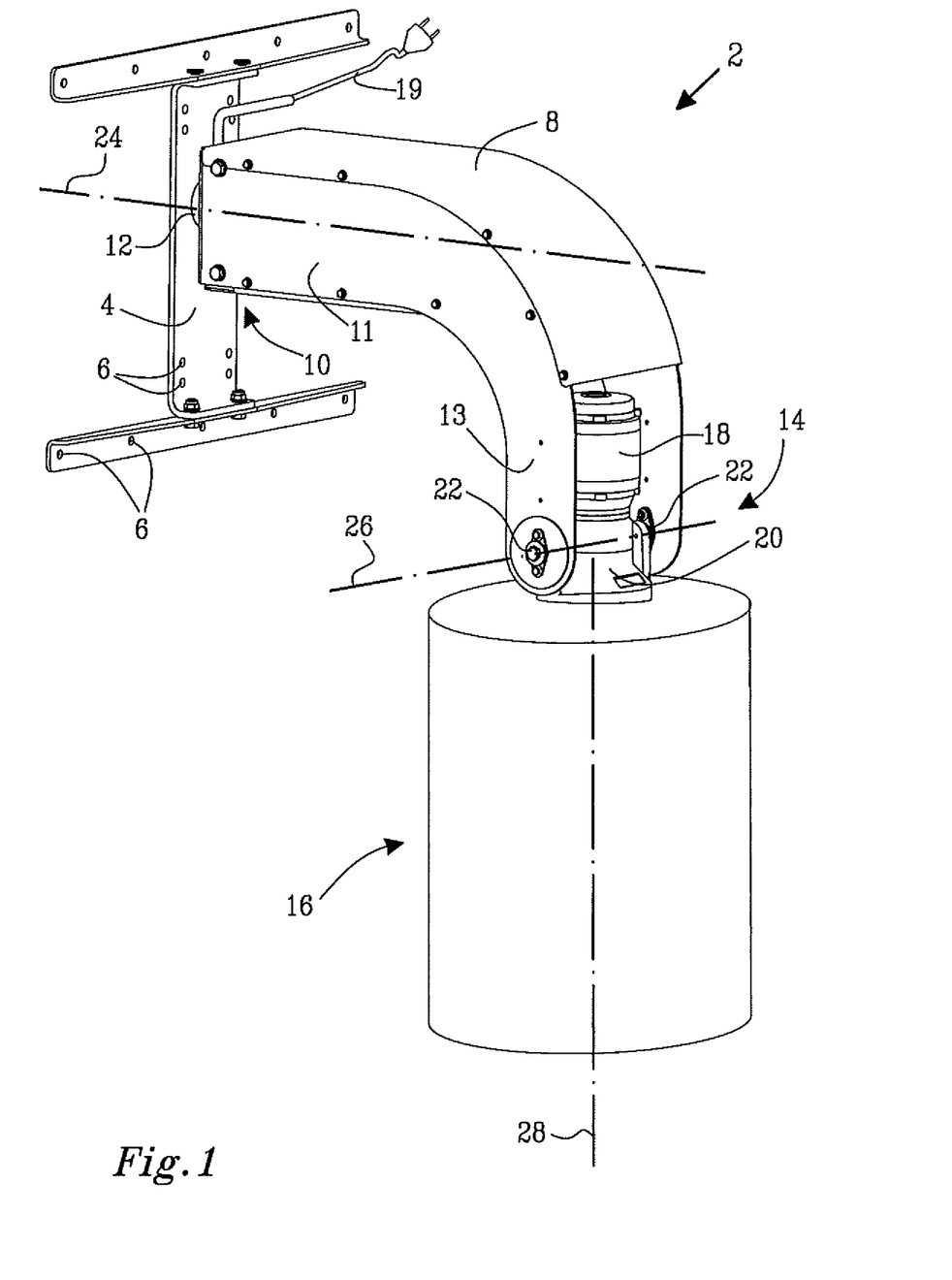
FIG. 1 illustrates an animal brushing arrangement according to embodiments.

FIG. 1 illustrates an animal brushing arrangement 2 according to embodiments. The animal brushing arrangement 2 is adapted to be attached to a stationary structure (not shown) by means of a fixing part 4. The fixing part 4 is provided with holes 6 for bolting the fixing part 4 to the stationary structure. A first movable part 8, at a first end 10 thereof, is pivotably attached to the fixing part 4 by means of a first pivot arrangement 12. The first movable part 8 comprises a first section 11 and a second section 13 extending at substantially a 90 degree angle to the first section 11. At a second end 14 of the first movable part 8 there is provided a movable brush 16 for brushing an animal. The movable brush 16 is a rotating brush which is rotated by an electric motor 18. An electric cable 19 extends from the electric motor 18 through an inside of the first movable part 8 and a centre of the first pivot arrangement 12 for connection to a point of electric connection, such as a wall socket. The electric cable 19 may be any common rubber or plastic material cable provided with two or more conductors. The movable brush 16 and the electric motor 18 are attached to a second movable part 20. The second movable part 20 is pivotably attached to the second end 14 of the first movable part 8. There are provided two hinges 22 about which the second movable 20 part may pivot. In its simplest form the movable part 20 comprises a structure supporting the electric motor 18 and parts of the hinges 22. The first and second movable parts 8, 20 form a carrying structure for the electric motor and the movable brush 16.

In the illustrated embodiments, besides parts of the two hinges 22, the second movable part 20 comprises a transmission arrangement arranged between the electric motor 18 and the movable brush 16. The electric motor 18 is thus provided adjacent to the movable brush 16. The transmission arrangement may comprise a gearbox adapted to reduce the number of revolutions per minute of the electric motor to a number of revolutions suitable for brushing an animal. The transmission arrangement may further comprise a slipping clutch such that a torque up to only a maximum torque value may be transferred to the movable brush 16. The maximum torque value may correspond to a tangential force of between 50-150 N being applied to an outer periphery of the movable brush 16. As an alternative to the slipping clutch, the electric motor 18 may be of a type providing only a limited torque, e.g. a maximum torque which will corresponds to a maximum tangential force at the outer periphery of the movable brush 16 of between 50-150 N. Such an electric motor is the single phase AC asynchronous motor of type MM71p4 of the manufacturer Carpanelli, distributed by MAK Aandrijvingen BV, Lelystad, The Netherlands. If for such an electric motor 18 an external force of between 50-150 N is applied tangentially to the outer periphery of the movable brush 16 while electric power is supplied to the electric motor 18, the movable brush 16 stops rotating. Thanks to the slipping clutch, or the limited torque supplying electric motor 18, an entangled object may be freed from the movable brush 16 by pulling on the object in a direction away from the movable brush 16.

When the animal brushing arrangement 2 is attached to a stationary structure, the first movable part 8 may pivot about a substantially horizontal first axis 24. The first axis 24 extends through the first pivot arrangement 12. The two hinges 22 provide a substantially horizontal second axis 26, which is arranged substantially perpendicularly to the first axis 24. The movable brush 16 is cylindrical and a longitudinal axis 28 of the movable brush 16 extends in a substantially vertical direction when the brushing arrangement 2 is not used by an animal. The movable brush 16 may have a diameter of 10-80 cm and a length of 40-100 cm, preferably the brush may have a diameter of 35-65 cm and a length of 40-80 cm, other sizes may of course be used. Bristles of the movable brush 16 may be 5-35 cm long, preferably 8-28 cm long. The bristles are bendable and stiff such that they may extend radially from the movable brush 16 and be used for grooming, brush and/or massaging an animal. With a 25 cm radius of the movable brush 16 a force of between 50-150 N applied tangentially to the outer periphery of the movable brush 16 results in a torque of 12.5-37.5 Nm, i.e. the torque that may be required to stop the movable brush from rotating even when electric power is supplied to the electric motor 18.

The first movable part 8 has a certain length such that the movable brush 16 is arranged at a distance from the first pivot arrangement 12, seen in a horizontal direction. The first pivot arrangement 12 is adjacent to the fixing part 4 and since the fixing part 4 has a negligible extension in the horizontal direction, the first pivot arrangement 12 and thus, the pivot point of the first movable part 8 is provided close to the stationary structure and at a distance from the movable brush 16.

Figure 2:
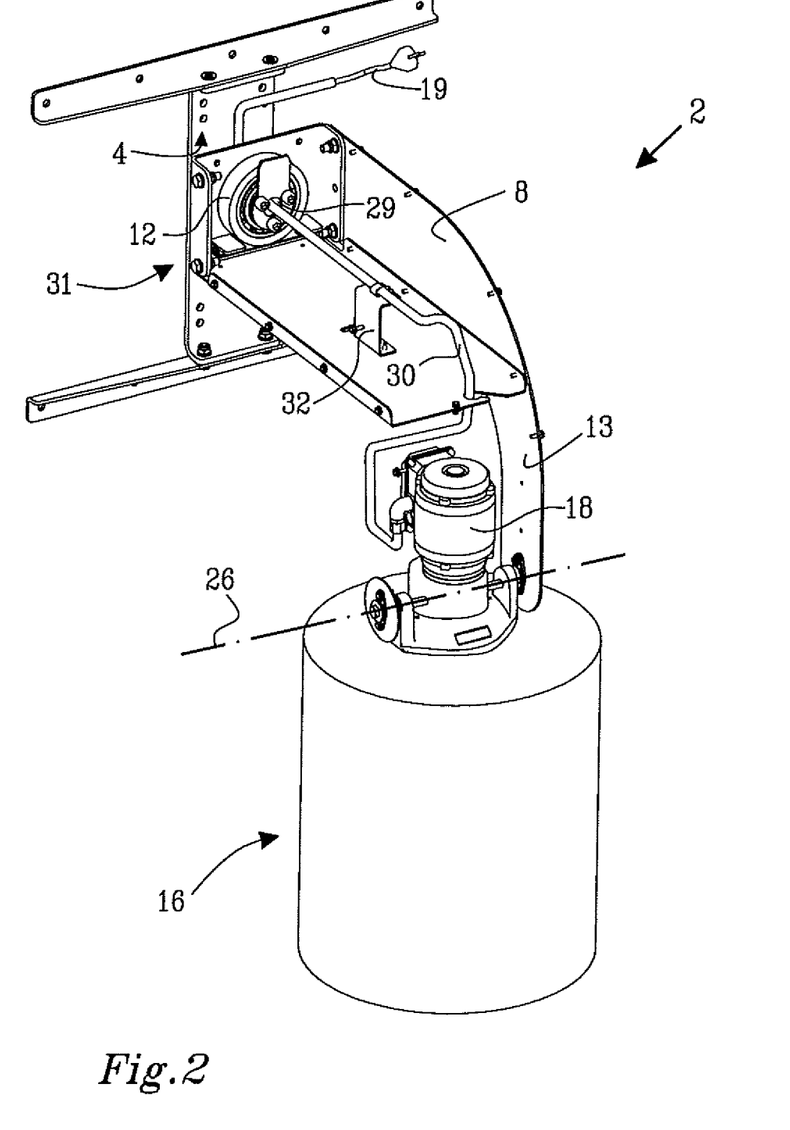
FIG. 2 illustrates the animal brushing arrangement of FIG. 1 with wall elements removed to show an inside of a first movable part.

FIG. 2 illustrates the animal brushing arrangement 2 of FIG. 1 with wall elements removed to show an inside of the first movable part 8. The electric cable 19 extends between a point of electric connection (not shown) outside the animal brushing arrangement 2 and the electric motor 18. A cable casing 30 is provided which forms a cable duct through which the electric cable 19 extends at least partially, see below.

An element of the first pivot arrangement 12, forming part of the fixing part 4 or being attached to the fixing part 4, is at its centre provided with a through hole 29. The electric cable 19 extends from the fixing part 4 through the through hole of the first pivot arrangement 12 into the first movable part 8. Thus, the electric cable 19, at a portion, is fixed or at least stationary in relation to the fixing part 4. Inside the first movable part 8 there is provided a supporting element 32 by means of which the electric cable 19 is supported. Accordingly, at the supporting element 32 the electric cable 19 follows any movements of the first movable part 8. The supporting element 32 may suitable have a height such that the electric cable 19 is substantially in line with the centre of the pivot arrangement 12, i.e. in line with the first axis 24 (shown in FIG. 1). Thus, when the first movable part 8 pivots back and forth, the cable 19 is only twisted along its length. Depending on the distance between the first pivot arrangement 12 and the supporting element 32 the twisting of the electric cable 19 per length unit may be kept relatively low and thus the electric cable 19 may be subjected to only small amounts of stress. A suitable distance between the first pivot arrangement 12 and the supporting arrangement 32 may be 20-100 cm, suitably 40-80 cm.

The cable casing 30 extends at least from the first pivot arrangement 12 via its through hole 29 to the supporting element 32, to which the casing 30 is attached, and along the second section 13 of the first movable part 8 to the electric motor 18. The cable casing 30 is taut in a portion extending between the through hole 29 and the supporting element 32.

At the second section 13 the cable casing 30 extends in a loop to allow for pivoting of the electric motor 18 about the second axis 26. The cable casing 30 may be formed as a wound spring and may be made from a metal or plastic material. The cable casing 30 protects the electric cable 19 from mechanical wear and from animals chewing on the cable 19.

The animal brushing arrangement 2 comprises a blocking arrangement 31 for preventing the first movable part 8 from rotating a complete revolution with respect to the fixing part 4. Stopping devices of the blocking arrangement 31 will abut against each other if the first movable part 8 pivots to a certain degree. As the stopping devices abut against each other further pivoting is prevented. Thus, the electric cable 19 is prevented from being twisted more than to a certain degree.

Figure 3:
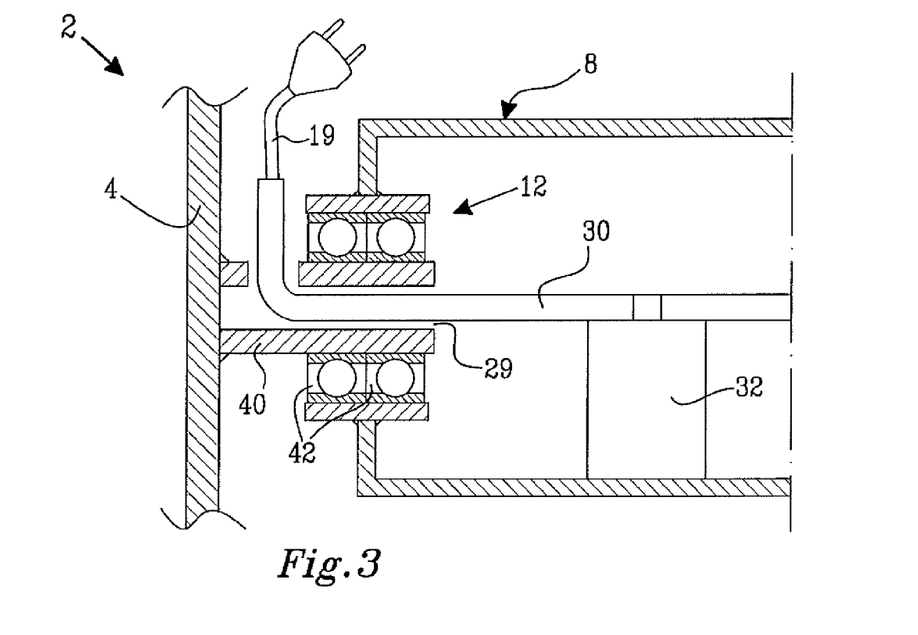
FIG. 3 illustrates a cross section through part of an animal brushing arrangement according to embodiments.

FIG. 3 illustrates a cross section through part of an animal brushing arrangement 2 according to embodiments. A first movable part 8 is pivotably attached to a fixing part 4. A first pivot arrangement 12 comprises a round element 40 attached to the fixing part 4, two bearings 42 and two bearing seats arranged on the first movable part 8. The round element 40 is provided with a through hole 29. A cable casing 30 extends through the through hole 29 and is attached to a supporting arrangement 32 inside the first movable part 8. The cable casing 30 extends further to a not-shown electric motor for driving a movable brush. An electric cable 19 extends through the cable casing 30. Again, the cable casing 30 protects the electric cable 19 and provides support for the electric cable inside the first movable part 8 to ensure that the electric cable 19 is affected only to a small extent by pivoting of the first movable part 8.

Figure 4:
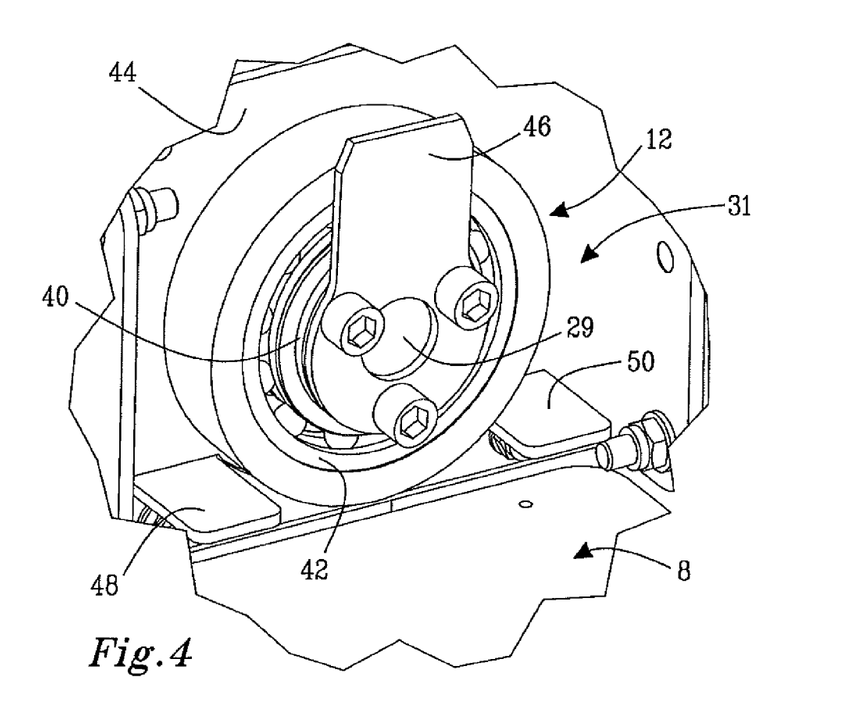
FIG. 4 illustrates a blocking arrangement at a wall of a first movable part of an animal brushing arrangement according to embodiments.

FIG. 4 illustrates part of a wall 44 of a first movable part 8 of an animal brushing arrangement according to embodiments. The wall 44 is illustrated from an inside of the movable part 8 and is adapted to be arranged adjacent to a not-shown fixing part of the animal brushing arrangement. The fixing part is adapted to be attached to a stationary structure. A first pivot arrangement 12 is arranged for pivoting the first movable part 8 in relation to the fixing part. A round element 40 of the first pivot arrangement 12 is attached, or forms part of, the fixing part and is provided with a centrally arranged through hole 29. The through hole 29 may be utilized for leading an electric cable there through. The first pivot arrangement 12 comprises a bearing seat arranged in the first movable part 8 and a ball bearing 42.

The animal brushing arrangement comprises a blocking arrangement 31 for preventing the first movable part 8 from rotating a complete revolution with respect to the fixing part. The blocking arrangement 31 comprises a first stopping device 46 attached to the round element 40 and thus, arranged fixedly in relation to the fixing part. The blocking arrangement 31 further comprises two second stopping devices 48, 50 attached to the wall 44 of the first movable part 8 next to the pivot arrangement 12 such that when the first movable part 8 pivots about the first pivot arrangement 12 the second stopping devices 48, 50 come to abut against the first stopping device 46. A first of the second stopping devices 48 will abut against the first stopping device 46 when the first movable part 8 has rotated about 90 degrees in a clockwise direction. A second of the second stopping devices 50 will abut against the first stopping device 46 when the first movable part 8 has rotated about 90 degrees in a counter clockwise direction. Accordingly, a movable brush attached to the first movable part 8 will be prevented from swinging too high, while the movable brush can still reach upper parts, such as a back or a head, of an animal. The first and second stopping devices 46, 48, 50 may alternatively be arranged such that each of the second stopping devices 48, 50 will abut against the first stopping device 46 when the first movable part 8 has pivoted to a position in which a longitudinal axis of the movable brush has reached an angle of between 160-175 degrees from a vertical resting position. If an electric cable extends through the through hole 29, it is prevented from being twisted more than the blocking arrangement 31 permits.

Figure 5:
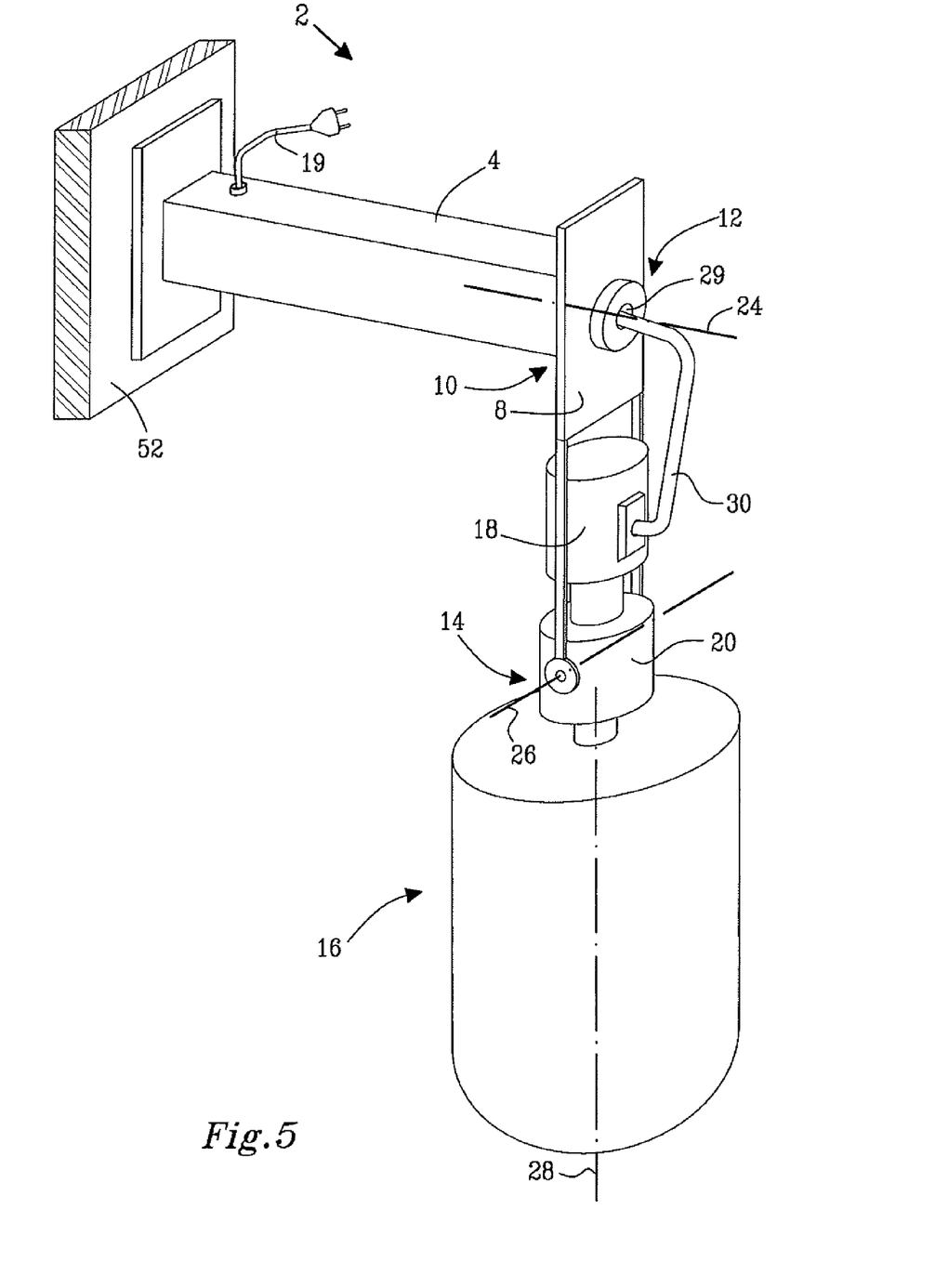
FIG. 5 illustrates an animal brushing arrangement according to embodiments.

FIG. 5 illustrates an animal brushing arrangement 2 according to embodiments. The animal brushing arrangement 2 is attached to a stationary structure 52 by means of a fixing part 4. A first movable part 8, at a first end 10, is pivotably attached to the fixing part 4 by means of a first pivot arrangement 12. At a second end 14 of the first movable part 8 there is provided a movable brush 16 for brushing an animal. The movable brush 16 is a rotating brush which is rotated by an electric motor 18. An electric cable 19 extends from the electric motor 18 along the first movable part 8, through a through hole 29 at a centre of the first pivot arrangement 12 and through the fixing part 4 for connection to a point of electric connection, such as a wall socket. The movable brush 16 and the electric motor 18 are attached to a second movable part 20. The second movable part 20 is pivotably attached to the second end 14 of the first movable part 8. The first and second movable parts 8, 20 form a carrying structure for the electric motor and the movable brush 16. Seen in a horizontal direction, the first movable part 8 and the movable brush 16 are substantially in the same position, i.e. not at a distance from each other. There are provided two hinges about which the second movable part 20 may pivot. Besides parts of the two hinges, the second movable part 20 comprises a transmission arrangement arranged between the electric motor 18 and the movable brush 16. Again, the transmission arrangement may comprise a gearbox and/or a slipping clutch, or the electric motor 18 may be a limited torque electric motor, as explained above in connection may be a limited torque with FIG. 1. A cable casing 30 is provided through which the electric cable 19 extends at least partially. The cable casing 30 and the electric cable 19 extend from the electric motor 18 through the through hole 29 of the first pivot arrangement 12 into the fixing part 4.

The animal brushing arrangement 2 may pivot about a substantially horizontal first axis 24. The first axis 24 extends through the first pivot arrangement 12. The two hinges provide a substantially horizontal second axis 26, which is arranged substantially perpendicularly to the first axis 24. The movable brush 16 is cylindrical and a longitudinal axis 28 of the brush extends in a substantially vertical direction when the brushing arrangement 2 is not used by an animal. Due to the electric cable 19 extending through the through hole 29 in the centre of the first pivot arrangement 12, the electric cable 19 will not be subjected to any pinching when the first movable part 8 pivots about the first axis 24. The electric cable 19 is only twisted to the same degree as the first movable part 8 pivots. Thus, the electric cable 19 is not subjected to any significant amounts of stress when first movable part 8 pivots back and forth. The cable casing 30 and the electric cable 19 extend in a loop between the first pivot arrangement 12 and the electric motor 18 to allow for pivoting of the electric motor 18 about the second axis 26. Again, a not shown blocking arrangement may be provided to prevent the first movable part 8 from rotating a complete revolution around the first pivot arrangement 12.

Figure 6:
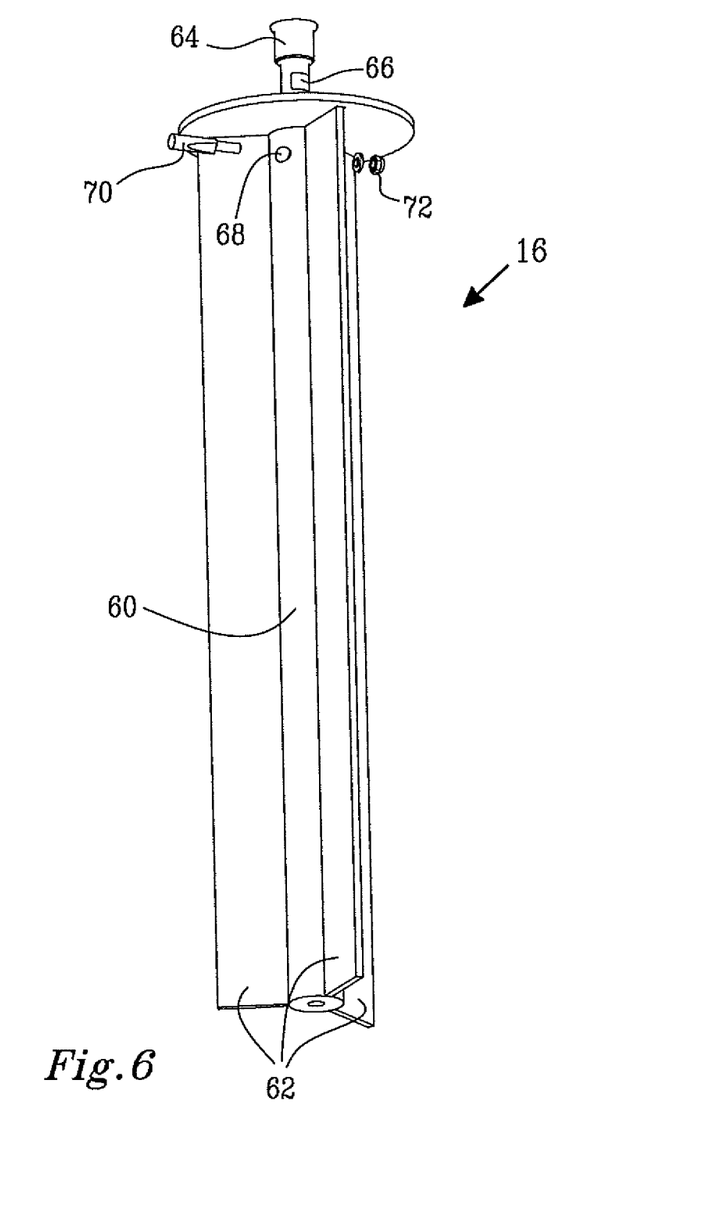
FIG. 6 illustrates schematically a movable brush of an animal brushing arrangement according to embodiments.

FIG. 6 illustrates schematically a movable brush 16 of an animal brushing arrangement according to embodiments. For ease of illustration, the movable brush 16 is illustrated without bristles, in an unattached state. Only a shaft 60 and flanges 62 of the movable brush 16 are illustrated. The movable brush 16 is adapted to be attached to a drive shaft 64. The drive shaft 64 may suitably be an output shaft from a transmission arrangement or an electric motor.

For the purpose of releasably attaching the movable brush 16 to the drive shaft 64, there are provided a recess 66 with a flat bottom surface on the drive shaft 64, an opening 68 in the shaft 60 of the movable brush 16 and a pin 70 with a flat surface. To attach the movable brush 16 to the drive shaft 64, the shaft 60 of the movable brush 16, which is at least partially hollow, is positioned on the drive shaft 64 such that the opening 68 is aligned with the recess 66. The pin 70 is inserted into the opening 68 such that the flat surface of the pin 70 abuts against the flat surface of the groove 66 in the drive shaft 64. The pin 70 is secured in place by means of a nut 72. To release the movable brush 16 from the drive shaft 64, the nut 72 and the pin 70 are removed. As an alternative to the recess 66, the drive shaft 64 may be provided with a hole through which the pin 70 may extend. In this case the pin 70 need not be provided with a flat surface. Thus, in order to change a movable brush 16 of an animal brushing arrangement there is no need to remove an entire second movable part from the animal brushing arrangement, or the entire animal brushing arrangement from a stationary structure. Accordingly, the electric cable leading to an electric motor of the animal brushing arrangement is not affected by the changing of a movable brush of the animal brushing arrangement.

Figure 7:
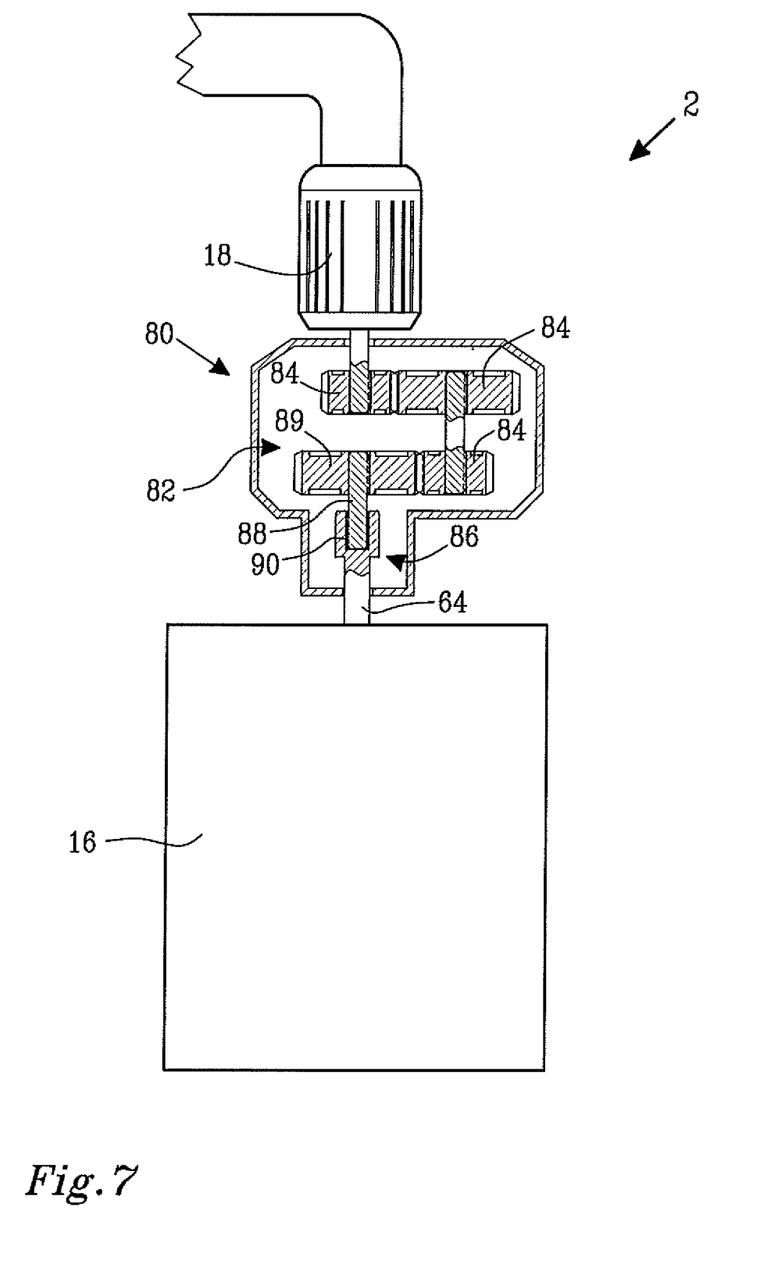
FIG. 7 illustrates a cross section through a transmission arrangement of an animal brushing arrangement according to embodiments.

FIG. 7 illustrates a cross section through a transmission arrangement 80 of an animal brushing arrangement 2 according to embodiments. The transmission arrangement 80 comprises a gearbox 82 with cog wheels 84, 89. An electric motor 18 is attached to the transmission arrangement 80 and drives the cog wheels 84, 89 of the gearbox 82. A movable brush 16 is connected to an outgoing drive shaft 64 of the transmission arrangement 80. The movable brush is thus rotated by the electric motor 18 via the transmission arrangement 80. By means of the gearbox 82 the number of revolutions per minute of the movable brush 16 is reduced from the number of revolutions per minute of the electric motor 18. A slipping clutch 86 is arranged between the drive shaft 64 and a shaft 88 of a last cog wheel 89 of the gearbox 82. The shaft 88 of the last cog wheel 89 and the drive shaft 64 are frictionally engaged and may be provided with a friction increasing coating 90.

The slipping clutch 86 will ensure that only a limited torque can be transferred from the gearbox 82 to the movable brush 16. If the torque applied to the shaft 88 of the last cog wheel 89 is above a maximum torque value, the slipping clutch 86 will slip and only the maximum torque will be transferred to the movable brush 16. There will be a relative movement between the shaft 88 of the last cog wheel 89 and the drive shaft 64. It may thus be ensured that a certain force with a tangential component of, e.g. between 50-150 Newton, applied to an outer periphery of the movable brush 16, will stop the movable brush 16 from rotating even though the electric motor 18 is provided with electric power and continues to rotate.

Embodiments described above may be combined as understood by a person skilled in the art. Although the invention has been described with reference to example embodiments, many different alterations, modifications and the like will become apparent for those skilled in the art.

Therefore, it is to be understood that the foregoing is illustrative of various example embodiments and the invention is not to be limited to the specific embodiments disclosed and that modifications to the disclosed embodiments, combinations of features of disclosed embodiments as well as other embodiments are intended to be included within the scope of the appended claims. It is for instance understood that a carrying structure may be a simple frame to which the electric motor and the movable brush are attached.

As used herein, the term "comprising" or "comprises" is open-ended, and includes one or more stated features, elements, steps, components or functions but does not preclude the presence or addition of one or more other features, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

The invention claimed is:

1. An animal brushing arrangement (2) for mounting to a stationary structure and comprising:
   an electric motor (18);
   a movable, rotating brush (16) driven by the electric motor (18), the electric motor (18) provided adjacent to the brush (16);
   a fixing part (4) adapted for attaching to the stationary structure,
   a first movable part (8) including i) a first end (10) having an end wall (44) wherein the first end is pivotably attached to the fixing part (4) by a first pivot arrangement (12), ii) a second end (14) suspending the brush (16), and iii) a through hole (29) within the first pivot arrangement (12), and
   a blocking arrangement (31) located internally within the first movable part and comprising i) a first stopping device (46) and ii) two second stopping devices (48, 50) positioned on opposite sides of the first stopping device (46), the blocking arrangement (31) preventing the first movable part (8) from rotating a complete revolution with respect to the fixing part (4) when the second stopping devices (48, 50) come to abut against the first stopping device (46), wherein at least one of said first stopping device and said two second stopping devices remains in a fixed position relative to said fixing part during pivotal movement of said first movable part, when in use,
   wherein, when the fixing part (4) is attached to the stationary structure, i) the first pivot arrangement (12) allows pivoting about a first axis (24) which is substantially horizontal, ii) the second end (14) allows the brush (16), suspended at the second end (14) of the first movable part (8), to change from an initial neutral position to swing back and forth in at least one plane, and iii) at least part of the through hole (29) is arranged substantially concentrically with the first axis (24); and an electric cable (19) extending from the first end (10) of the movable part (8), through the through hole (29), to the electric motor (18), the electric cable (19) having a length sufficient, when the fixing part (4) is attached to the stationary structure, to extend from stationary structure to the electric motor (18) to feed electric power to the electric motor (18), wherein the brush is freely swingable, swinging around the first axis, and the change of the brush from the initial neutral position to swinging back and forth in the at least one plane rotation of the brush about the first axis (24) is caused exclusively by a force of an animal against the brush, a magnitude of a degree of the swinging corresponding to a magnitude of the force of the animal against the brush with a maximum of the degree of swinging being limited by the first stopping device (46) of the blocking arrangement (31) preventing the first movable part (8) from rotating beyond the first stopping device (46).

2. The animal brushing arrangement (2) according to claim 1, further comprising:
a second movable part (20) attached to i) the second end (14) of the first movable part (8), ii) the brush (16), and iii) the electric motor (18),
wherein the second movable part (20) being pivotably attached to the second end (14) of the first movable part (8), and pivotal about a substantially horizontal second axis (26), the brush being freely swingable about the second axis based on the magnitude of the force of the animal against the brush.

3. The animal brushing arrangement (2) according to claim 1, wherein the brush (16), seen in a horizontal direction when the fixing part (4) is attached to the stationary structure, is suspended at a distance below the first pivot arrangement (12).

4. The animal brushing arrangement (2) according to claim 1, wherein,
the first movable part (8) comprises a first section (11) a second section (13), and
when the animal brushing arrangement is attached to the stationary structure, the first section (11) extends in a substantially horizontal direction from the fixing part (4), the second section (13) extends at substantially a 90 degree angle to the first section (11), and said end wall extends at substantially a 90 degree angle to the first section (11).

5. The animal brushing arrangement (2) according to claim 1, further comprising:
a cable casing (30) extending from the fixing part (4) through the through hole (29) and to the electric motor (18), the cable casing (30) forming a cable duct through which the electric cable (19) extends.

6. The animal brushing arrangement (2) according to claim 5, wherein the cable casing (30) is fixed in relation to the fixing part (4) and in relation to the first movable part (8) such that the cable casing (30) is taut in a portion thereof extending through the through hole (29).

7. The animal brushing arrangement (2) according to claim 6, further comprising:
a supporting arrangement (32) located inside and attached to the first movable part (8), the supporting arrangement (32) supporting the cable casing (30) substantially at a level of the first axis (24).

8. The animal brushing arrangement (2) according to claim 1, wherein the first movable part (8) is hollow and the electric cable (19) extends from the through hole (29) through an inside of the first movable part (8) towards the brush (16).

9. The animal brushing arrangement (2) according to claim 1, wherein,
i) the first stopping device (46) is arranged fixedly in relation to the fixing part (4) and attached to one part of the first pivot arrangement (12), and
ii) the two second stopping devices (48, 50) are attached to the end wall (44) of the first movable part (8) next to the pivot arrangement (12) such that when the first movable part (8) pivots about the first pivot arrangement (12), the second stopping devices (48, 50) come to abut against the first stopping device (46).

10. The animal brushing arrangement (2) according to claim 1, wherein the brush (16) is attached to a drive shaft (64) releasably connected to the electric motor (18).

11. The animal brushing arrangement (2) according to claim 10, wherein the brush (16) is releasably attached to the drive shaft (64) by a pin (70) extending through an opening (68) in a shaft (60) of the brush (16) and interacting with one of a recess (66) and a hole in the drive shaft (64).

12. The animal brushing arrangement (2) according to claim 1, further comprising:
a brush stopping unit (80), the brush stopping unit (80) configured to sense a force applied to an outer periphery of the brush (16) while electric power is supplied to the electric motor (18),
wherein the brush stopping unit (80) is configured to stop rotation of the brush (16) when a pre-set force is sensed.

13. The animal brushing arrangement (2) according to claim 12,
wherein the brush stopping unit (80) is integral to the electric motor (18) and is configured to stop rotation of the brush (16) when the sensed pre-set force is between 50 and 150 Newtons.

14. The animal brushing arrangement (2) according to claim 12,
wherein the brush stopping unit (80) is attached to an output shaft of the electric motor (18) and a drive shaft (64) of the brush (16).

15. The animal brushing arrangement (2) according to claim 14,
wherein the brush stopping unit (80) comprises a slipping clutch (86) operative connected between the output shaft of the electric motor (18) and the drive shaft (64) of the brush 16), the slipping clutch (86) configured to stop rotation of the brush (16) when the sensed pre-set force comprises a tangential component of between 50 and 150 Newtons.

16. The animal brushing arrangement (2) according to claim 1, wherein,
the first pivot arrangement (12) comprises a round element (40) attached to the fixing part (4), two bearings (42) on an exterior of the round element (40), bearing seats of the two bearings (42) attached on said end wall section (44) of the first movable part (8), the round element (40) provided with the through hole (29).

* * * * *